3,324,156
PURIFICATION OF ESTERS
Harry J. Elder, Springdale, and Norman W. Franke, Penn Hills Township, Allegheny County, Pa., assignors to Gulf Research & Development Company, Pittsburgh, Pa., a corporation of Delaware
No Drawing. Filed Dec. 22, 1961, Ser. No. 161,359
6 Claims. (Cl. 260—410.6)

This invention relates to a process for reducing the acidity and improving the color of organic esters.

In preparing organic esters generally stoichiometric amounts of alcohols and mono- or polyfunctional organic acids are theoretically required. Quite often in order to consume substantially all of one of the reactants, a slight excess, perhaps up to about 10 percent by volume, of the other reactant is employed. The reactant employed in excess is usually the one which can be most easily removed from the reaction mixture. The esters recovered from the reaction mixture are not always satisfactory for commercial use, however, since they generally possess a high acidity and an objectionable color.

The high acidity of the ester can occur for several reasons. In cases wherein there is incomplete reaction between the alcohol and the organic acid, and the organic acid is in excess, the ester produced will be contaminated with some of the organic acid. Further contamination of the ester can occur in reactions wherein an acidic catalyst such as sulfuric acid is employed. In addition side reactions often occur producing acidic compounds which further contaminate the desired ester.

Color bodies in the ester can occur from several sources. Often the color impurities arise as a result of contaminants present in the charge. Strong acidic catalysts tend to cause side reactions resulting in the formation of color bodies. Sometimes elevated temperatures are employed to increase the reaction rate between the alcohol and the organic acid, and this contributes to the likelihood of the occurrence of the side reactions described above.

We have found that the acidity of such esters can be reduced appreciably by the mere expedient of contacting the ester with carbon which has been treated with ammonia. The reduction in acidity of the ester when so treated is greater than the reduction obtained when the ester is treated separately with equivalent amounts of carbon and ammonia. Surprisingly the ability of the carbon to improve the color of the ester is not adversely affected by the presence of the ammonia. The benefits to be derived from being able simultaneously to reduce the acidity of an ester by an unexpected margin and improve its color are obvious.

The conditions under which the esters which are to be treated in accordance with the process of the present invention are prepared are conventional and need not be described in great detail. Thus, the esterification is satisfactorily carried out by refluxing the organic acid with an alcohol in approximately stoichiometric amounts, preferably in the presence of a suitable catalyst, e.g., sulfuric acid, dry hydrogen chloride, paratoluene sulfonic acid, or the like, for a period of about one-half to about fifty hours. Although esterification can proceed to some degree at temperatures as low as room temperature, elevated temperatures on the order of about 60° to about 250° C. are preferably employed. When temperatures exceeding the boiling point of water are employed, and the alcohol used is not completely miscible with water, water of esterification can be trapped off, thus tending to drive the esterification reaction to completion. Examples of organic alcohols which can be employed include methyl alcohol, ethyl alcohol, propyl alcohol, isopropyl alcohol, butyl alcohol, isobutyl alcohol, secondary butyl alcohol, hexyl alcohol, octyl alcohol, isooctyl alcohols (such as prepared by the Oxo process), 2-ethylhexyl alcohol, decyl alcohol, tridecyl alcohol, octadecyl alcohol, benzyl alcohol, cyclohexyl alcohol, ethylene glycol, hexylene glycol, triethylene glycol, glycerol, pentaerythritol, dipentaerythritol, etc. Examples of organic acids which can be employed include formic, acetic, propionic, butyric, isobutyric, pentanoic, pivalic, hexanoic, octanoic, isooctanoic (including 2-ethylhexoic and mixtures of isooctanoic acids such as produced from the Oxo and other carbonylation processes), nonanoic, isononanoic, decanoic, lauric, tridecanoic, oleic, stearic, benzoic, toluic, phthalic, isophthalic, terphthalic, trimellitic, pyromellitic, oxalic, succinic, glutaric, adipic, azelaic, sebacic, acrylic, methacrylic, lactic, chloracetic, chlorobenzoic, etc. The esters which are to be treated in accordance with the process of this invention contain from two to 200 carbon atoms in the molecule, preferably from about 10 to about 120 carbon atoms in the molecule. Examples of esters which can be treated by the process defined herein include methyl formate, methyl acetate, ethyl acetate, isopropyl propionate, hexyl octanoate, stearyl tridecanoate, dibutyl oxalate, dioctyl adipate, diisooctyl azelate, hexyl decyl sebacate, diethyl phthalate, diisooctyl phthalate, butyl benzyl phthalate, pentaerythritol tetraisooctanoate, tripentaerythritol tridecanoate, etc.

The carbon which is to be employed in the process is one which has a high pore volume, pore diameter and surface area. The pore volume is at least about 0.3, preferably about 0.5 to about 1.2, cubic centimeters per gram of carbon. The carbon should have greater than about five percent of its pore volume in pores having a diameter in the range of about 10 to about 50 angstroms. The surface area (internal as well as external) of the carbon must be at least about 500, preferably about 800 to about 2000, square meters per gram of carbon. Any suitable method which will permit the desired amount of ammonia to be adsorbed on the surface of the carbon is suitable. Thus, ammonia gas can be passed through the carbon at atmospheric pressure and atmospheric temperature until the carbon has adsorbed and retains at least about 0.001, preferably about 0.1 to about 0.3 gram of ammonia per gram of carbon. While we are not absolutely certain in what manner the ammonia is associated with the carbon, we believe the ammonia is adsorbed on both the inner and outer surfaces of the carbon as a thin film. In this way the surface presented by the ammonia to the ester is extremely great and a highly effective contact between the ammonia and the ester is obtained. It would be expected that the film of ammonia on the surface of the carbon would reduce the probability of contact of the ester with the carbon itself and thereby impair the ability of the carbon to remove color bodies from the ester. Instead we have found that the ability of the carbon to remove color bodies from the ester is not impaired by the presence of the ammonia on the surface of the carbon.

The treatment of the impure ester with the carbon described above can be effected in any manner, provided there is effective and adequate contact therebetween. Thus the ester can be mixed with the carbon, and after a suitable contact time, for example from about ¼ hour to about 10 hours, the treated ester can be separated from the carbon in any convenient manner, for example, by filtration. Preferably the carbon treated with ammonia is placed in a cylinder and the ester is permitted to flow through the same at space velocity, grams of ester per gram of carbon per hour, which can be, for example, from about one to about 100. The contact time given is given only by way of example, for even an extremely short contact time will give some of the desired benefits as to reduction in acidity and color. Pressures and temperatures are not critical and any suitable pressure can be employed under the conditions of treatment. Thus the pressure can be, for example, from about 10 to about 100 pounds per square inch absolute and the temperature about −20° to about 150° C. In the discussion above the assumption was made that the ester to be treated was a liquid. In the event the ester is a solid the same can be admixed with an inert solvent therefor, such as pentane, hexane, heptane, benzene, toluene, cyclohexane, acetone, methyl ethyl ketone, diethyl ether, diisopropyl ether, etc. and the resulting solution can be treated in the manner described. After treatment the solvent can be separated from the ester by any convenient means, for example by distillation.

The process of this invention can further be described by reference to the following examples.

*Example I*

Pentaerythritol tetraisooctanoate employed in the present examples was prepared as follows. To a twelve-liter multineck flask, equipped with a thermowell, stirrer, condenser and a water take off apparatus was added 1190 grams pentaerythritol, 5292 grams of isooctanoic acid (5% excess) and 5.9 grams concentrated sulfuric acid. The flask was sparged with carbon dioxide and stirred while bringing the flask contents to the esterification temperature of about 130° C. The temperature of about 130° to 135° C. was maintained while stirring and sparging with carbon dioxide for 15 hours, water of reaction being constantly removed until a total of 477 grams of water had been collected. Gas sparging was continued until the contents of the flask had been cooled to room temperature, at which time a titration showed the product to be 89.5 percent esterified. The product was next neutralized by adding the stoichiometric amount plus 10 percent of aqueous sodium hydroxide with stirring. After three water washes the product was heated to 110° C. for two hours and sparged with nitrogen to remove the last traces of water. The neutralization number of the ester determined in accordance with ASTM D 974 was 2.51. The color rating of the ester was 500. This was determined in accordance with ASTM D 1045. The neutralization number and color of the esters herein were all determined in accordance with such tests.

Sixty-six and two-tenths grams of pentaerythritol tetraisooctanoate prepared above were passed through a column containing 17.6 grams of Pittsburgh Coke and Chemical Co. OL type carbon. The column of carbon was 36 inches in height and had a diameter of 0.5 inch. The average particle size of the carbon was 20 to 50 mesh, the pore volume was 0.8 cubic centimeter per gram and the total surface area was about 1000 square meters per gram. A space velocity of 16 and atmospheric temperature and pressure were employed. The neutralization number of the treated ester was 1.61 and the color rating was 50.

*Example II*

One hundred grams of the impure ester prepared above was stirred and at atmospheric pressure and temperature and over a period of 2½ hours 1.7 grams per hour of anhydrous ammonia was bubbled therethrough. The neutralization number of the treated ester was 0.05 and the color rating was 500.

*Example III*

At atmospheric pressure and temperature 31.6 grams of CAL type 12 x 40 mesh Pittsburgh Coke and Chemical Co. carbon having a pore volume of 0.8 cubic centimeter per gram and a total surface area of about 1000 square meters per gram was treated with anhydrous ammonia until 2.07 grams of the ammonia had been adsorbed thereon. A column of said carbon having a height of 36 inches and a diameter of 0.5 inch was formed. Sixty-two and six-tenths grams of the impure ester prepared above was passed through the column at atmospheric pressure and temperature at a space velocity of 16. The neutralization number of the treated ester was <0.01 and the color rating was 45.

The data of Examples I, II and III clearly show that better results are obtained when an impure ester is treated with carbon carrying ammonia than with carbon and ammonia separately. Thus in Example I, wherein the ester was treated with untreated carbon the neutralization number was 1.61. In Example II when ammonia alone was used the neutralization number was 0.05. But in Example III wherein the carbon employed was initially treated with ammonia the neutralization number was reduced still further to <0.01. Moreover, in Example II wherein 100 grams of the ester was treated with 4.32 grams of anhydrous ammonia, 0.043 gram of ammonia was employed per gram of ester. In Example III wherein 62.6 grams of the ester was treated with 2.07 grams of anhydrous ammonia, 0.033 gram of ammonia was employed per gram of ester. And yet the reduction in acidity of the ester in Example III was greater than the reduction in acidity of the ester in Example II. Unexpectedly the color of the ester was not impaired by the presence of the ammonia on the carbon. In fact the color of the ester in Example III was somewhat better than the color of the ester of Example II.

Obviously many modifications and variations of the invention, as hereinabove set forth, can be made without departing from the spirit and scope thereof, and therefore only such limitations should be imposed as are indicated in the appended claims.

We claim:

1. A process for reducing the acidity and improving the color of an ester of an aliphatic acid with an aliphatic alcohol carrying impurities which give rise to acidity and color bodies which comprises contacting such ester with carbon carrying ammonia, said carbon having a pore volume of at least about 0.3 cubic centimeter per gram thereof and a surface area of at least about 500 square meters per gram thereof, with at least about 5 percent of its pore volume being in pores having a diameter in the range of about 10 to about 50 angstroms.

2. A process for reducing the acidity and improving the color of an ester of an aliphatic acid with an aliphatic alcohol carrying impurities which give rise to acidity and color bodies which comprises contacting such ester with carbon carrying about 0.001 to about 0.3 gram of ammonia per gram of carbon, said carbon having a pore volume of at least about 0.3 cubic centimeter per gram thereof and a surface area of at least about 500 square meters per gram thereof, with at least about 5 percent of its pore volume being in pores having a diameter in the range of about 10 to about 50 angstroms.

3. A process for reducing the acidity and improving the color of an ester of an aliphatic acid with an aliphatic alcohol carrying impurities which give rise to acidity and color bodies which comprises contacting such ester with carbon carrying about 0.001 to about 0.3 gram of ammonia per gram of carbon as a film on the surface of said carbon, said carbon having a pore volume of at least about 0.3 cubic centimeter per gram thereof and a surface area of at least about 500 square meters per gram thereof, with at least about 5 percent of its pore volume being in pores having a diameter in the range of about 10 to about 50 angstroms.

4. A process for reducing the acidity and improving the color of pentaerythritol tetraisooctanoate carrying impurities which give rise to acidity and color bodies which comprises contacting such ester with carbon carrying ammonia, said carbon having a pore volume of at least about 0.3 cubic centimeter per gram thereof and a surface area of at least about 500 square meters per gram thereof, with at least about 5 percent of its pore volume being in pores having a diameter in the range of about 10 to about 50 angstroms.

5. A process for reducing the acidity and improving the color of pentaerythritol tetraisooctanoate carrying impurities which give rise to acidity and color bodies which comprises contacting such ester with carbon carrying about 0.001 to about 0.3 gram of ammonia per gram of carbon, said carbon having a pore volume of at least about 0.3 cubic centimeter per gram thereof and a surface area of at least about 500 square meters per gram thereof, with at least about 5 percent of its pore volume being in pores having a diameter in the range of about 10 to about 50 angstroms.

6. A process for reducing the acidity and improving the color of pentaerythritol tetraisooctanoate carrying impurities which give rise to acidity and color bodies which comprises contacting such ester with carbon carrying about 0.001 to about 0.3 gram of ammonia per gram of carbon as a film on the surface of said carbon, said carbon having a pore volume of at least about 0.3 cubic centimeter per gram thereof and a surface area of at least about 500 square meters per gram thereof, with at least about 5 percent of its pore volume being in pores having a diameter in the range of about 10 to about 50 angstroms.

References Cited

UNITED STATES PATENTS

| | | | |
|---|---|---|---|
| 1,705,824 | 3/1929 | Odeen | 260—427 |
| 1,705,825 | 3/1929 | Odeen | 260—427 |
| 2,781,301 | 2/1957 | Payne | 260—428 |
| 2,862,961 | 12/1958 | Goreau | 260—410.6 |
| 2,975,152 | 3/1961 | Hurwitz et al. | 260—410.6 |
| 2,991,297 | 7/1961 | Cooley et al. | 260—410.6 |

ALEX MAZEL, *Primary Examiner.*

ABRAHAM H. WINKELSTEIN, HENRY R. JILES, *Examiners.*

ALVIN E. TANENHOLTZ, JOSEPH P. BRUST, *Assistant Examiners.*